US011885273B2

(12) United States Patent
Gruenbeck et al.

(10) Patent No.: US 11,885,273 B2
(45) Date of Patent: Jan. 30, 2024

(54) METHOD AND DEVICE FOR ASCERTAINING THE FLOW THROUGH A TIMER VALVE

(71) Applicant: Vitesco Technologies GmbH, Regensburg (DE)

(72) Inventors: Karl Gruenbeck, Kelheim (DE); Tobias Hirthammer, Langquaid (DE)

(73) Assignee: Vitesco Technoloiges GmbH, Regensburg (DE)

( * ) Notice: Subject to any disclaimer, the term of this patent is extended or adjusted under 35 U.S.C. 154(b) by 0 days.

(21) Appl. No.: 17/658,520

(22) Filed: Apr. 8, 2022

(65) Prior Publication Data

US 2022/0228537 A1 Jul. 21, 2022

Related U.S. Application Data

(63) Continuation of application No. PCT/EP2020/074931, filed on Sep. 7, 2020.

(30) Foreign Application Priority Data

Oct. 9, 2019 (DE) ..................... 10 2019 215 472.7

(51) Int. Cl.
*F02D 41/00* (2006.01)
*F02D 41/14* (2006.01)

(52) U.S. Cl.
CPC ..... *F02D 41/0045* (2013.01); *F02D 41/1401* (2013.01); *F02D 2041/1433* (2013.01); *F02D 2200/0602* (2013.01)

(58) Field of Classification Search
CPC ...... F02D 41/00; F02D 41/0045; F02D 41/14; F02D 41/1401; F02D 2200/0602; F02D 2041/1433

(Continued)

(56) References Cited

U.S. PATENT DOCUMENTS 5,714,683 A 2/1998 Maloney
5,974,870 A 11/1999 Treinies
(Continued)

FOREIGN PATENT DOCUMENTS

DE 19844086 A1 11/1999
DE 60201570 T2 3/2005
(Continued)

OTHER PUBLICATIONS

International Search Report and Written Opinion dated Dec. 10, 2020 from corresponding International Patent Application No. PCT/EP2020/074931.

(Continued)

*Primary Examiner* — John Kwon
*Assistant Examiner* — Johnny H Hoang

(57) ABSTRACT

The disclosure relates to a method for ascertaining the flow through a timer valve. The method includes detecting the pressure upstream of the timer valve during an evacuation of a container arranged upstream of the timer valve, ascertaining the flow through the timer valve based on the detected pressure upstream of the timer valve and based on the temperature and the volume of the gas in the container. The method also includes comparing the flow ascertained during the evacuation and a modeled flow and/or comparing a variable dependent on the ascertained flow and a variable dependent on the modeled flow. Additionally, the method includes adapting the model in the event of a discrepancy between the flow ascertained during the evacuation and the modeled flow and/or in the event of a discrepancy between the variable dependent on the ascertained flow and the variable dependent on the modeled flow.

18 Claims, 2 Drawing Sheets

(58) Field of Classification Search
USPC .................................................. 123/387, 445
See application file for complete search history.

(56) References Cited

U.S. PATENT DOCUMENTS

| | | | | |
|---|---|---|---|---|
| 6,196,203 | B1 * | 3/2001 | Grieve | F02M 25/08 123/198 D |
| 6,253,750 | B1 | 7/2001 | Duty et al. | |
| 2001/0025525 | A1 * | 10/2001 | Isobe | F02M 25/0809 73/114.39 |
| 2001/0032637 | A1 * | 10/2001 | Grieve | F02D 41/0045 123/674 |
| 2003/0047161 | A1 * | 3/2003 | Bagnasco | F02D 41/0042 123/295 |
| 2003/0051715 | A1 * | 3/2003 | Bagnasco | F02M 25/089 123/698 |
| 2005/0034513 | A1 * | 2/2005 | Streib | F02M 25/0818 73/114.39 |
| 2006/0162705 | A1 * | 7/2006 | Grunwald | F02M 25/0809 73/114.38 |
| 2006/0277984 | A1 | 12/2006 | Bleile | |
| 2007/0246020 | A1 * | 10/2007 | Sawut | F02M 21/0212 123/495 |
| 2009/0204309 | A1 * | 8/2009 | Eser | F02M 25/0809 123/518 |
| 2018/0195444 | A1 | 7/2018 | Collet | |

FOREIGN PATENT DOCUMENTS

| | | | |
|---|---|---|---|
| DE | 102004049737 | A1 | 6/2006 |
| DE | 102005018272 | A1 | 10/2006 |
| DE | 102019205483 | B3 | 9/2020 |
| WO | 9735106 | A2 | 9/1997 |

OTHER PUBLICATIONS

German Search Report dated Feb. 22, 22 for corresponding German Patent Application No. 10 2019 215 472.7.

* cited by examiner

METHOD AND DEVICE FOR ASCERTAINING THE FLOW THROUGH A TIMER VALVE

CROSS-REFERENCE TO RELATED APPLICATIONS

This application claims the benefit of PCT Application PCT/EP2020/074931, filed Sep. 7, 2020, which claims priority to German Application 10 2019 215 472.7, filed Oct. 9, 2019. The disclosures of the above applications are incorporated herein by reference.

TECHNICAL FIELD

The disclosure relates to a method and a device for ascertaining the flow through a timer valve, such as through a timer valve of a motor vehicle. The timer valve may be a tank vent valve.

BACKGROUND

In motor vehicles driven by gasoline engines, fuel gases are discharged from the fuel tank via a tank vent line, temporarily stored in an adsorption filter and then fed to the combustion of the gasoline engine via a tank vent valve. In this way, fuel gases that leave the tank for the purpose of pressure equalization can be captured and then reused, which reduces losses. Because of the raw engine emissions, it is necessary in this case to operate the engine with a stoichiometric ratio of air and fuel. For this purpose, the amount of fuel injected must be corrected by the amount of fuel gas supplied by the tank venting. To be able to carry out this correction of the amount of fuel injected, the flow through the tank vent valve must be ascertained.

It is known to ascertain this flow by taking measurements from the tank venting system and making them available to the engine control as calibration values or as a data model. However, taking measurements from the tank venting system is laborious. In addition, neither an age-related change in the system characteristics nor manufacturing tolerances in the components, i.e. in particular the valves, can be taken into account. This affects the accuracy of the injection correction, which can lead to discrepancies in the mixture in the combustion chamber and thus to increased emissions from the internal combustion engine.

SUMMARY

The disclosure provides a method and a device for ascertaining the flow through a timer valve that also allow the flow to be determined with high accuracy over a relatively long period of time.

The method for ascertaining the flow through a timer valve includes the following steps: detecting the pressure upstream of the timer valve during an evacuation of a container arranged upstream of the timer valve, ascertaining the flow through the timer valve based on the detected pressure upstream of the timer valve and based on the temperature and the volume of the gas in the container, comparing the flow ascertained during the evacuation and a modeled flow and/or comparing a variable dependent on the ascertained flow and a variable dependent on the modeled flow, and adapting the model in the event of a discrepancy between the flow ascertained during the evacuation and the modeled flow and/or in the event of a discrepancy between the variable dependent on the ascertained flow and the variable dependent on the modeled flow.

Implementations of the disclosure may include one or more of the following optional features. In some implementations, an existing model of the flow through the timer valve is adapted or corrected, to be precise based on a flow through the timer valve that is present during an evacuation of a container located upstream of the timer valve. The model may be a preexisting model. A step of modeling the flow through the timer valve and/or modeling a variable that is dependent on the flow may also be provided as part of the method. A possible model will be discussed later. As explained at the beginning, the flow modeled by the model may have inaccuracies due to aging of system components and due to component tolerances.

In some examples, the pressure upstream of the timer valve is ascertained during an evacuation of the container arranged upstream of the timer valve. The pressure is ascertained, for example, during the entire period of time of the evacuation. A pressure gradient can thus be determined. The flow through the timer valve during the evacuation is then ascertained from the pressure or the pressure gradient as well as from the temperature and the volume of the gas in the container. Any inflows to the system, such as, to the container, may be closed during the evacuation. The flow ascertained during the evacuation is then compared with the modeled flow. A comparison may also be made between a variable dependent on the ascertained flow and a variable dependent on the modeled flow. Such a dependent variable may be, for example, the amount of flow, that is to say the mass flowing through the timer valve over a certain period of time—such as, over the entire period of time of the evacuation.

Should this comparison result in a discrepancy between the ascertained flow and the modeled flow or the variables dependent thereon, the model on which the modeled flow is adapted accordingly. In this way, the flow model can be checked for plausibility and, if necessary, adapted. For example, the discrepancy may be recorded in an adaptation factor and henceforth taken into account when calculating the flow through the tank vent valve. In this way, component aging and component tolerances can be taken into account in a simple manner. If the timer valve is used as a tank vent valve for a motor vehicle, the method provides that discrepancies in the mixture in the combustion chamber, and thus increased emissions from the internal combustion engine, can be avoided over the entire service life of the system.

In some examples, the ascertainment of the flow through the timer valve during the evacuation is carried out based on the following relationship $$\dot{m}_{out\ of\ tank} = \frac{V_{gas\ in\ tank}}{R_{gas\ in\ tank} \cdot T_{gas\ in\ tank}} \cdot \dot{p}_{tank}$$

$$\dot{m}_{out\ of\ tank} = \frac{V_{gas\ in\ tank}}{R_{gas\ in\ tank} \cdot T_{gas\ in\ tank}} \cdot \dot{p}_{tank}$$

where $\dot{m}_{out\ of\ tank}$ is the flow through the timer valve, $V_{gas\ in\ tank}$ is the volume of the gas in the container, $R_{gas\ in\ tank}$ is the specific gas constant of the gas in the container, $T_{gas\ in\ tank}$ is the temperature of the gas in the container, and $\dot{p}_{tank}$ is the pressure gradient in the container.

As can be seen directly from the relationship, the flow through the timer valve is therefore ascertained based on the detected pressure, i.e. based on a pressure gradient, and based on the temperature and the volume in the container. The container may be fuel tank of a motor vehicle.

In some examples, the amount of flow that has flowed through the timer valve in a predetermined period of time is determined from the flow ascertained during the evacuation. The amount of flow is a variable that is dependent on the flow ascertained. The flow may also be referred to as mass flow, the amount of flow as mass. In some examples, a comparison can then be made between the ascertained amount of flow and the modeled amount of flow and, in the event of a discrepancy between these amounts of flow, the model on which the modeled amount of flow is based can be adapted.

In some examples, the amount of flow may be determined according to the following relationship:

$$m_{out\ of\ tank} = \int_{t_0}^{t_{end}} \dot{m}_{out\ of\ tank}\ dt$$

where $\dot{m}_{out\ of\ tank}$ is the flow through the timer valve and $m_{out\ of\ tank}$ is the amount of flow that has flowed through the timer valve in the time period from $t_0$ to $t_{end}$.

The time $t_0$ in this case denotes the beginning of the evacuation process of the container and the time $t_{end}$ denotes the end of the evacuation process of the container. In this way, the amount of gas escaping from the tank over the entire evacuation process can be determined.

In some implementations, one or more of the following parameters is/are included in the model on which the modeled flow is based: a detected pressure upstream of the timer valve, a detected pressure downstream of the timer valve, the cross-sectional area of the timer valve through which the flow passes, an ascertained opening time of the timer valve, an ascertained closing time of the timer valve. In some examples, the modeling of the flow through the timer valve may be performed by ascertaining the flow through the timer valve while taking into account a detected pressure upstream of the timer valve, a detected pressure downstream of the timer valve, an ascertained opening time of the timer valve and an ascertained closing time of the timer valve.

In some implementations, the following relationship may be used for the modeling of the flow through the timer valve:

$$\dot{m}_{TVV} = A \cdot \Psi\left(\frac{P_{down,TVV}}{P_{up,TVV}}, \kappa\right) \cdot \frac{P_{up,TVV}}{\sqrt{R_s \cdot T_{up,TVV}}}$$

where $\dot{m}_{TVV}$ is the flow through the timer valve, $A_r$ is a reduced cross-sectional area of the timer valve through which the flow passes, $\Psi$ is a flow parameter, $P_{down,TVV}$ is the detected pressure downstream of the timer valve, $P_{up,TVV}$ is the detected pressure upstream of the timer valve, k is an isentropic exponent of the mass flow through the timer valve, and $R_s$ is a specific gas constant of the mass flow through the timer valve.

Here, the index "TVV" stands for tank vent valve. As mentioned at the beginning, the timer valve may be such a tank vent valve.

In some implementations, the flow parameter mentioned may be ascertained based on the following relationship:

$$\Psi = \begin{cases} \sqrt{\frac{2\kappa}{\kappa-1}} \cdot \sqrt{\left(\frac{P_{down,TVV}}{P_{up,TVV}}\right)^{\frac{2}{\kappa}} - \left(\frac{P_{down,TVV}}{P_{up,TVV}}\right)^{\frac{\kappa+1}{\kappa}}}, & \frac{P_{down,TVV}}{P_{up,TVV}} > p_{cr} \\ \sqrt{\frac{2\kappa}{\kappa-1}} \cdot \left(\frac{2}{\kappa+1}\right)^{\frac{1}{\kappa-1}}, & \frac{P_{down,TVV}}{P_{up,TVV}} \le p_{cr} \end{cases}$$

where $p_{cr}$ is a critical pressure ratio.

In some implementations, the method includes the step of: modeling the flow through the timer valve and/or modeling a variable that is dependent on the flow, as already mentioned. The modeling may be performed according to one of the relationships explained above. The variable that is dependent on the flow may be the amount of flow. The modeling step may take place before the flow is ascertained. The modeling may also be performed in parallel.

In some implementations, the container is evacuated by a flushing pump arranged between the container and the timer valve or by a negative pressure in an intake tract arranged downstream of the timer valve. During the evacuation, accesses that would allow pressure equalization in the container are blocked. For example, a supply of fresh air to the container is prevented by way of a shut-off valve.

In some examples, the pressure upstream of the timer valve is ascertained during the evacuation by a pressure sensor which is arranged upstream of the timer valve, for example in the container or in a line running between the container and the timer valve.

In some examples, the timer valve is a tank vent valve, as already mentioned.

The disclosure also relates to a device for ascertaining the flow through a timer valve, including a control unit which is designed to carry out the method explained above. The explanations given for the method apply accordingly to the device. For example, the device may have a pressure sensor upstream of the timer valve for ascertaining the pressure during the evacuation of the container.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
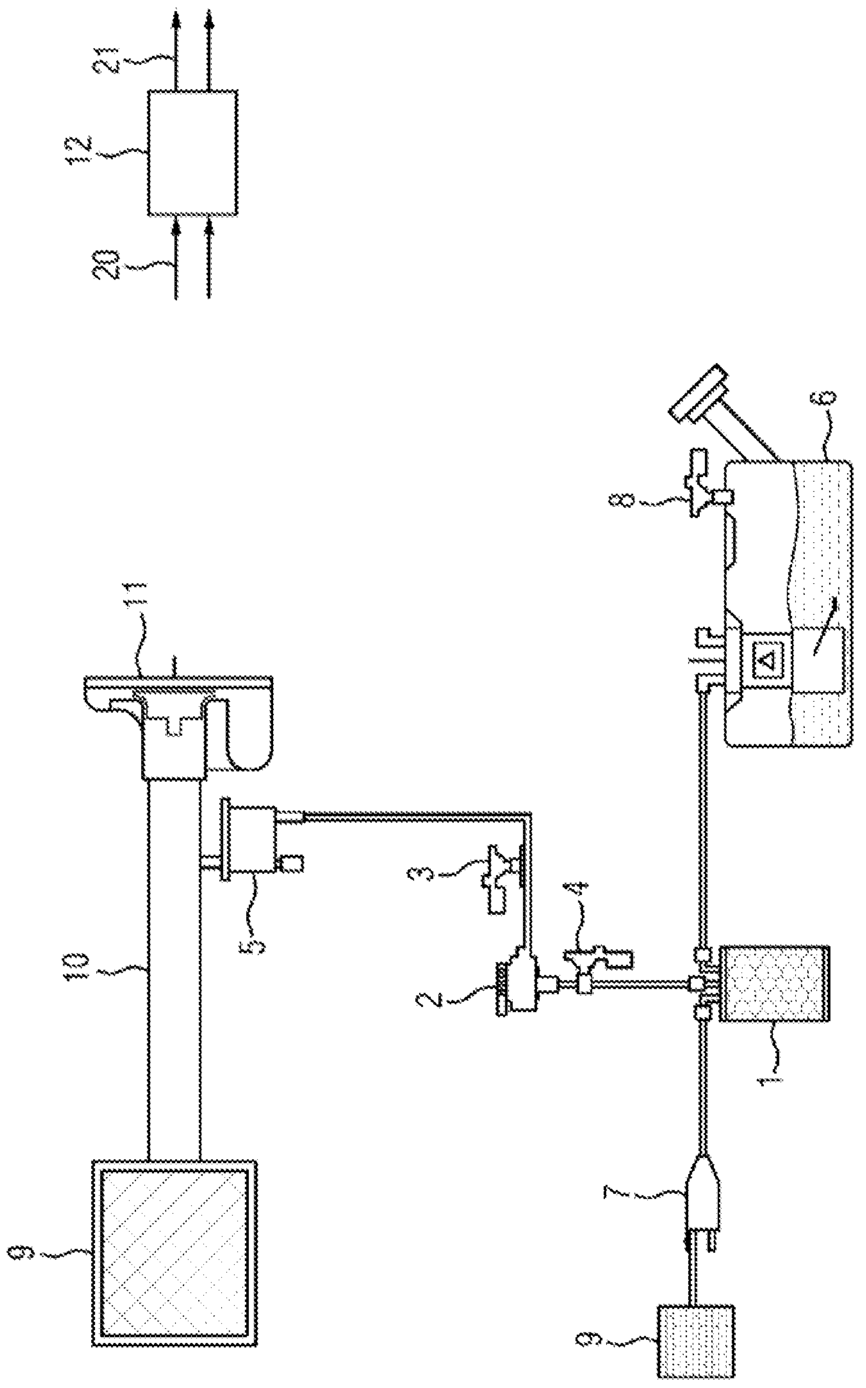
FIG. 1 shows a device for carrying out a method according to the disclosure.

FIG. 1 shows a device according to the disclosure in which the flow through a tank vent valve of a motor vehicle is ascertained and adapted. The device shown in FIG. 1 forms a tank venting system with a fuel tank 6 as a container. An activated carbon canister 1, to which fresh air is supplied via an air filter 9 through a shut-off valve 7, is connected to the fuel tank 6. Furthermore, the activated carbon canister 1 is connected to a tank vent valve 5 via an optionally provided flushing pump 2. A pressure sensor 3 is arranged in the line between the flushing pump 2 and the tank vent valve 5. If the flushing pump 2 is missing, the pressure sensor 3 is arranged between the activated carbon canister 1 and the tank vent valve 5. A further pressure sensor 8 is arranged in the fuel tank 6 upstream of the tank vent valve 5. In addition, a further pressure sensor 4 is located upstream of the tank vent valve 5 before the flushing pump 2. An intake tract 10 with a compressor 11 and an air filter 9 is located downstream of the tank vent valve 5.

A mass flow flowing from the fuel tank 6 to the tank vent valve 5 is directed downstream of the tank vent valve 5 into the intake tract 10 and mixed there with fresh air to be compressed, which is fed to the intake tract 10 through the air filter 9. The compressor 11 may be part of an exhaust gas turbocharger.

To control the combustion process, an engine control 12 is provided as a control unit, which provides output signals 21 based on input signals 20 fed to it and stored working software. The input signals 20 fed to the engine control 12 may be sensor signals and/or data signals provided by a higher-level control. The sensor signals include, for example, pressure sensor signals, temperature sensor signals and gas-pedal position signals. The output signals 21 include control signals for the injection valves and the tank vent valve 5.

The flow through the tank vent valve 5 is first calculated using a physical model, according to the following relationship:

$$\dot{m}_{TVV} = A \cdot \Psi\left(\frac{P_{down,TVV}}{P_{up,TVV}}, \kappa\right) \cdot \frac{P_{up,TVV}}{\sqrt{R_s \cdot T_{up,TVV}}}$$

where $\dot{m}_{TVV}$ is the flow through the tank vent valve, $A_r$ is a reduced cross-sectional area of the tank vent valve through which the flow passes, $\Psi$ is a flow parameter, $P_{down,TVV}$ is the detected pressure downstream of the tank vent valve, $P_{up,TVV}$ is the detected pressure upstream of the tank vent valve, k is an isentropic exponent of the mass flow through the tank vent valve, and $R_s$ is a specific gas constant of the mass flow through the tank vent valve.

For the flow parameter, the following may apply:

$$\Psi = \begin{cases} \sqrt{\frac{2\kappa}{\kappa-1}} \cdot \sqrt{\left(\frac{P_{down,TVV}}{P_{up,TVV}}\right)^{\frac{2}{\kappa}} - \left(\frac{P_{down,TVV}}{P_{up,TVV}}\right)^{\frac{\kappa+1}{\kappa}}}, & \frac{P_{down,TVV}}{P_{up,TVV}} > p_{cr} \\ \sqrt{\frac{2\kappa}{\kappa-1}} \cdot \left(\frac{2}{\kappa+1}\right)^{\frac{1}{\kappa-1}}, & \frac{P_{down,TVV}}{P_{up,TVV}} \le p_{cr} \end{cases}$$

where $p_{cr}$ is a critical pressure ratio.

Therefore, the pressure measured at the sensor 3 as well as geometrical variables, such as the cross-sectional area of the tank vent valve 5 through which the flow passes, are important input parameters. Such a model is always subject to certain assumptions and does not necessarily reflect the real flow through the tank vent valve exactly. For example, the area through which the flows passes may change over time due to component aging.

To check the plausibility, and if necessary to adapt the model, the change in state, i.e. the change in pressure and/or temperature, of the gas in the fuel tank 6 during an evacuation of the fuel tank 6 is therefore considered in a first step. The tank 6 is consequently evacuated, for example by way of the electric flushing pump 2 or, on account of a pressure gradient generated in some other way, by way of the tank vent valve 5, such as as a result of a negative pressure in the intake tract 10. Here, the supply of fresh air to the fuel tank 6 is prevented by way of the shut-off valve 7.

During the evacuation of the fuel tank 6, a pressure upstream of the tank vent valve 5 is detected by evaluating the data of the pressure sensor 8 in the tank 6. A pressure gradient is thus detected over the period of time of the evacuation process. The flow through the tank vent valve 5 from the fuel tank 6 to the intake tract 10 is then ascertained from the detected pressure/pressure gradient. The following relationship may be used for this:

$$\dot{m}_{out\ of\ tank} = \frac{V_{gas\ in\ tank}}{R_{gas\ in\ tank} \cdot T_{gas\ in\ tank}} \cdot \dot{p}_{tank}$$

where $\dot{m}_{out\ of\ tank}$ is the flow through the tank vent valve, $V_{gas\ in\ tank}$ is the volume of the gas in the tank, $R_{gas\ in\ tank}$ is the specific gas constant of the gas in the tank, $T_{gas\ in\ tank}$ is the temperature of the gas in the tank, $\dot{p}_{tank}$ is the pressure gradient in the tank.

As can be seen, the pressure gradient as well as the volume and the temperature of the gas in the fuel tank 6 are included in the flow, that is to say the mass flow from the fuel tank 6. By means of integration, an amount of flow, i.e. a mass that has escaped from the fuel tank 6 over the period of time of the evacuation process, can be determined from the flow, according to the following relationship:

$$m_{out\ of\ tank} = \int_{t_0}^{t_{end}} \dot{m}_{out\ of\ tank}\, dt$$

where $\dot{m}_{out\ of\ tank}$ is the flow through the tank vent valve and $m_{out\ of\ tank}$ is the amount of flow that has flowed through the tank vent valve in the time period from $t_0$ to $t_{end}$.

In parallel with this, the flow through the tank vent valve 5 may take place in accordance with the model explained. Also, a modeled amount of flow can be correspondingly determined from the modeled flow by integration.

Figure 2:
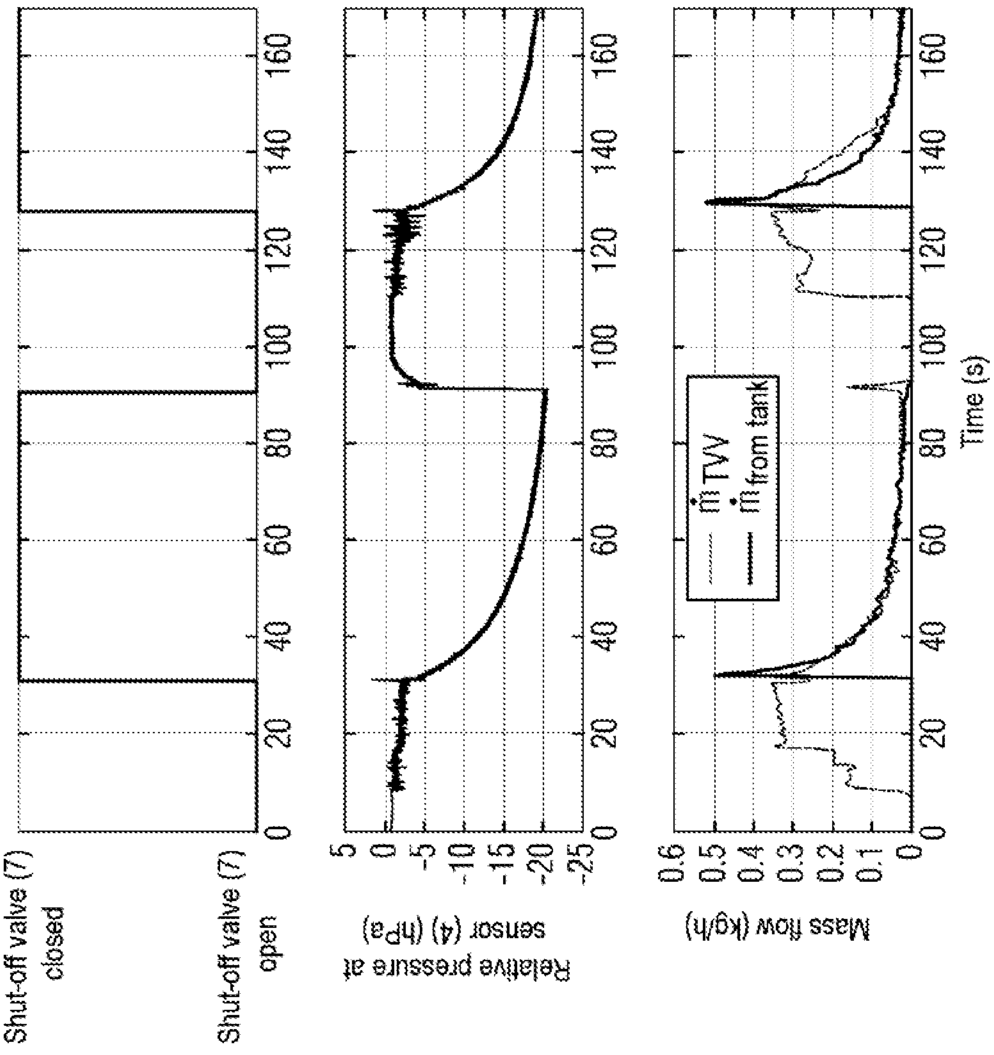
FIG. 2 shows diagrams of the variation in pressure and mass flow through a timer valve.

FIG. 2 is discussed for the purpose of illustration. FIG. 2 shows three diagrams one above the other, the upper diagram showing the two states of the shut-off valve 7, namely open and closed, over a time axis, the middle diagram showing the relative pressure at the sensor 4 over a corresponding time scale and the lower diagram showing the mass flow through the tank vent valve 5 over a corresponding time scale.

As can be seen, the shut-off valve 7 is closed in the time periods from approximately 30 seconds to 90 seconds and from 130 seconds, which represents an evacuation of the fuel tank 6. During these time periods, the measured relative pressure at the sensor 4 drops accordingly. In the lowest diagram of FIG. 2, both the modeled flow $\dot{m}_{TVV}$ and the flow $\dot{m}_{out\ of\ tank}$ through the tank vent valve 5 detected at the pressure sensor 8 during the evacuation are represented. These variables have been determined according to the relationships explained above, but according to the disclosure the flow $\dot{m}_{out\ of\ tank}$ is only determined during the closed phases of the shut-off valve 7—that is to say only during the evacuation.

A comparison of the flow ascertained during the evacuation and the modeled flow or a comparison of the corresponding amounts of flow represents the step which then follows. The result of this comparison, for example having the formation of a relative discrepancy between the modeled flow $\dot{m}_{TVV}$ and the ascertained flow $\dot{m}_{out\ of\ tank}$ during the evacuation, may be recorded in an adaptation factor $C_{AD}$. The adaptation factor $C_{AD}$ can henceforth be used in the calculation of the flow through the tank vent valve 5 according to the following relationship:

$$\dot{m}_{TVV,ad} = C_{ad} \cdot \dot{m}_{TVV}$$

The model on which the modeled flow is based can therefore be adapted in this sense.

A number of implementations have been described. Nevertheless, it will be understood that various modifications may be made without departing from the spirit and scope of the disclosure. Accordingly, other implementations are within the scope of the following claims.

What is claimed is:

1. A method for determining a gas flow of a gas through a timer valve of a vehicle supporting an engine, the method comprising:

detecting a pressure at a pressure sensor arranged upstream of the timer valve during an evacuation of a container arranged upstream of the timer valve;

determining, during the evacuation, the gas flow through the timer valve based on the detected pressure upstream of the timer valve, based on a temperature of the gas in the container from a temperature sensor, and based on a volume of the gas in the container, comparing the gas flow determined during the evacuation and a gas flow model modeling gas flow through the timer valve; and providing the gas flow model to control a combustion of the engine and adapting the gas flow model when a discrepancy is detected between the flow determined during the evacuation and the gas flow model, wherein an amount of flow that has flowed through the timer valve in a predetermined period of time is determined from the flow determined during the evacuation according to the following relationship:

$$m_{out\ of\ tank}=\int_{t_0}^{t_{end}}\dot{m}_{out\ of\ tank}dt$$

where $\dot{m}_{out\ of\ tank}$ is the flow through the timer valve during the evacuation and $m_{out\ of\ tank}$ is the amount of flow that has flowed through the timer valve in the time period from $t_0$ to $t_{end}$.

2. The method of claim 1, wherein the gas flow through the timer valve during the evacuation is determined based on the following relationship:

$$m_{out\ of\ tank}=\frac{V_{gas\ in\ tank}}{R_{gas\ in\ tank}\cdot T_{gas\ in\ tank}}\cdot p_{tank}$$

where $\dot{m}_{out\ of\ tank}$ is the gas flow through the timer valve during the evacuation, $V_{gas\ in\ tank}$ is the volume of the gas in the container, $R_{gas\ in\ tank}$ is a specific gas constant of the gas in the container, $T_{gas\ in\ tank}$ is the temperature of the gas in the container, $\dot{p}_{tank}$ is a pressure gradient in the container based on data of the pressure sensor.

3. The method of claim 1, wherein the gas flow model includes at least one or more selected from the group of: the detected pressure upstream of the timer valve, a detected pressure downstream of the timer valve, an ascertained opening time of the timer valve, and an ascertained closing time of the timer valve.

4. The method of claim 3, wherein the gas flow model is based on determining the flow through the timer valve while taking into account a detected pressure upstream of the timer valve, the detected pressure downstream of the timer valve, an ascertained opening time of the timer valve and the ascertained closing time of the timer valve.

5. The method of claim 4, wherein the gas flow model is determined based on the following:

$$\dot{m}_{TVV}=A\cdot\Psi\left(\frac{P_{down,TVV}}{P_{up,TVV}},\kappa\right)\cdot\frac{P_{up,TVV}}{\sqrt{R_s\cdot T_{up,TVV}}}$$

where $\dot{m}_{TVV}$ is the gas flow model through the timer valve, $A_r$ is a reduced cross-sectional area of the timer valve through which the flow passes, Ψ is a flow parameter, $P_{down,TVV}$ is the detected pressure downstream of the timer valve, $P_{up,TVV}$ is the detected pressure upstream of the timer valve, k is an isentropic exponent of a mass flow through the timer valve, and $R_s$ is a specific gas constant of the mass flow through the timer valve.

6. The method of claim 5, wherein the flow parameter is determined based on the following relationship:

$$\Psi=\begin{cases}\sqrt{\frac{2\kappa}{\kappa-1}}\cdot\sqrt{\left(\frac{P_{down,TVV}}{P_{up,TVV}}\right)^{\frac{2}{\kappa}}-\left(\frac{P_{down,TVV}}{P_{up,TVV}}\right)^{\frac{\kappa+1}{\kappa}}}, & \frac{P_{down,TVV}}{P_{up,TVV}}>p_{cr}\\ \sqrt{\frac{2\kappa}{\kappa-1}}\cdot\left(\frac{2}{\kappa+1}\right)^{\frac{1}{\kappa-1}}, & \frac{P_{down,TVV}}{P_{up,TVV}}\leq p_{cr}\end{cases}$$

where $p_{cr}$ is a critical pressure ratio.

7. The method of claim 1, wherein the gas flow model is based on the gas flow through the timer valve or a variable that is dependent on the gas flow.

8. The method of claim 1, further comprising:

evacuating the container by a flushing pump arranged between the container and the timer valve or by a negative pressure in an intake tract arranged downstream of the timer valve.

9. The method of claim 8, wherein the pressure sensor is arranged in the container or in a line running between the container and the timer valve.

10. The method of claim 1, wherein the timer valve is a tank vent valve.

11. A device for determining a gas flow of a gas through a timer valve of a vehicle supporting an engine, the device comprising:

an engine control unit carrying out a method comprising:

detecting a pressure at a pressure sensor arranged upstream of the timer valve during an evacuation of a container arranged upstream of the timer valve;

determining, during the evacuation, the gas flow through the timer valve based on the detected pressure upstream of the timer valve, based on a temperature of the gas in the container from a temperature sensor, and based on a volume of the gas in the container;

comparing the gas flow determined during the evacuation and a gas flow model modeling gas flow through the timer valve; and providing the gas flow model to control a combustion of the engine and adapting the gas flow model when a discrepancy between the flow determined during the evacuation and the gas flow model;

wherein an amount of flow that has flowed through the timer valve in a predetermined period of time is determined from the flow determined during the evacuation according to the following relationship:

$$m_{out\ of\ tank}=\int_{t_0}^{t_{end}}\dot{m}_{out\ of\ tank}dt$$

where $\dot{m}_{out\ of\ tank}$ is the flow through the timer valve during the evacuation and $m_{out\ of\ tank}$ is the amount of flow that has flowed through the timer valve in the time period from $t_0$ to $t_{end}$.

12. The device of claim 11, wherein an amount of flow that has flowed through the timer valve in a predetermined period of time is determined from the flow ascertained during the evacuation according to the following relationship:

$$m_{out\ of\ tank}=\int_{t_0}^{t_{end}}\dot{m}_{out\ of\ tank}dt$$

where $\dot{m}_{out\ of\ tank}$ is the flow through the timer valve during the evacuation and $m_{out\ of\ tank}$ is the amount of flow that has flowed through the timer valve in the time period from $t_0$ to $t_{end}$.

13. The device of claim 11, wherein the gas flow model includes at least one or more selected from the group of: the detected pressure upstream of the timer valve, a detected pressure downstream of the timer valve, an ascertained opening time of the timer valve, and an ascertained closing time of the timer valve.

14. The device of claim 13, wherein the gas flow model is based on determining the flow through the timer valve while taking into account a detected pressure upstream of the timer valve, the detected pressure downstream of the timer valve, an ascertained opening time of the timer valve and the ascertained closing time of the timer valve.

15. The device of claim 14, wherein the gas flow model is determined based on the following:

$$\dot{m}_{TVV} = A\cdot\Psi\left(\frac{P_{down,TVV}}{P_{up,TVV}},\kappa\right)\cdot\frac{P_{up,TVV}}{\sqrt{R_s\cdot T_{up,TVV}}}$$

where $\dot{m}_{TVV}$ is the gas flow model through the timer valve, $A_r$ is a reduced cross-sectional area of the timer valve through which the flow passes, $\Psi$ is a flow parameter, $P_{down,TVV}$ is the detected pressure downstream of the timer valve, $P_{up,TVV}$ is the detected pressure upstream of the timer valve, k is an isentropic exponent of a mass flow through the timer valve, and $R_s$ is a specific gas constant of the mass flow through the timer valve.

16. The device of claim 15, wherein the flow parameter is determined based on the following relationship:

$$\Psi = \begin{cases} \sqrt{\frac{2\kappa}{\kappa-1}}\cdot\sqrt{\left(\frac{P_{down,TVV}}{P_{up,TVV}}\right)^{\frac{2}{\kappa}}-\left(\frac{P_{down,TVV}}{P_{up,TVV}}\right)^{\frac{\kappa+1}{\kappa}}}, & \frac{P_{down,TVV}}{P_{up,TVV}} > p_{cr} \\ \sqrt{\frac{2\kappa}{\kappa-1}}\cdot\left(\frac{2}{\kappa+1}\right)^{\frac{1}{\kappa-1}}, & \frac{P_{down,TVV}}{P_{up,TVV}} \le p_{cr} \end{cases}$$

where $p_{cr}$ is a critical pressure ratio.

17. The device of claim 11, wherein the method further comprises:

evacuating the container by a flushing pump arranged between the container and the timer valve or by a negative pressure in an intake tract arranged downstream of the timer valve.

18. A method for determining a gas flow of a gas through a timer valve of a vehicle supporting an engine, the method comprising:

detecting a pressure at a pressure sensor arranged upstream of the timer valve during an evacuation of a container arranged upstream of the timer valve;

determining, during the evacuation, the gas flow through the timer valve based on the detected pressure upstream of the timer valve, based on a temperature of the gas in the container from a temperature sensor, and based on a volume of the gas in the container;

comparing the gas flow ascertained during the evacuation and a gas flow model modeling gas flow through the timer valve; and providing the gas flow model to control a combustion of the engine and adapting the gas flow model when a discrepancy is detected between the flow ascertained during the evacuation and the gas flow model, wherein the gas flow through the timer valve during the evacuation is determined based on the following relationship:

$$\dot{m}_{out\ of\ tank} = \frac{V_{gas\ in\ tank}}{R_{gas\ in\ tank}\cdot T_{gas\ in\ tank}}\cdot\dot{p}_{tank}$$

where $\dot{m}_{out\ of\ tank}$ is the gas flow through the timer valve during the evacuation, $V_{gas\ in\ tank}$ is the volume of the gas in the container, $R_{gas\ in\ tank}$ is a specific gas constant of the gas in the container, $T_{gas\ in\ tank}$ is the temperature of the gas in the container, $\dot{p}_{tank}$ is a pressure gradient in the container based on data of the pressure sensor.

* * * * *